United States Patent [19]
Wasser

[11] 3,834,090
[45] Sept. 10, 1974

[54] ROUTER BIT AND METHOD OF GRINDING SAID BIT

[76] Inventor: Ernest Wasser, 167 N. Leswing Ave., Saddle Brook, N.J. 07662

[22] Filed: Feb. 13, 1974

[21] Appl. No.: 442,121

Related U.S. Application Data

[60] Division of Ser. No. 355,290, April 27, 1973, Pat. No. 3,803,950, which is a continuation-in-part of Ser. No. 128,741, March 29, 1971, abandoned.

[52] U.S. Cl. ............................. 51/288, 76/101 A
[51] Int. Cl. ......................... B24b 1/00, B21k 21/00
[58] Field of Search .... 51/109, 288; 76/101, 101 A; 29/103, 103 A

[56] References Cited
UNITED STATES PATENTS

| | | | |
|---|---|---|---|
| 1,473,086 | 11/1923 | Dandsol | 76/101 A |
| 1,536,736 | 5/1925 | Vokal et al. | 51/288 |
| 1,931,684 | 10/1933 | Aker | 51/288 |
| 2,889,669 | 6/1959 | Babbitt | 51/288 |
| 3,283,449 | 11/1966 | Pinkowski | 51/288 |
| 3,680,262 | 8/1972 | Aydelott et al. | 51/288 |

FOREIGN PATENTS OR APPLICATIONS
864,741   4/1961   Great Britain ....................... 51/288

*Primary Examiner*—Harrison L. Hinson
*Attorney, Agent, or Firm*—Ralph R. Roberts

[57] ABSTRACT

A router bit for use with a power driven spindle is adapted for the cutting of plastic, wood and certain soft metals. This router bit is formed with straight flutes in which the cutting edge portions are inserts of hardened material such as tungsten carbide. Each insert is formed and mounted in the body to provide a short flat face extending inwardly from the outer cutting edge to an arcuate concave relief formed in the face of the insert. This short flat face portion of the cutting edge is ground to provide a selected angle of fifteen to thirty-five degrees to a theoretical radial line drawn from the axis of the router bit to the cutting edge of the insert. Initial and resharpening of these edges requires only a very little grinding on the face to sharpen and reshape this edge.

2 Claims, 8 Drawing Figures

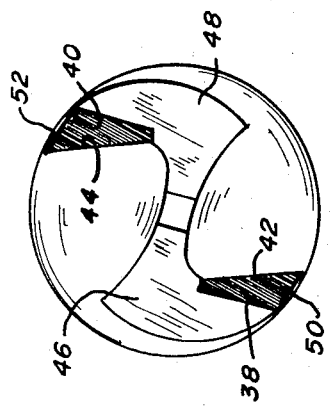
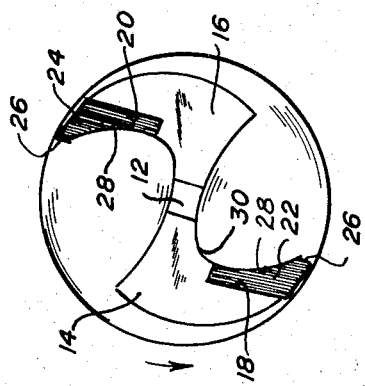
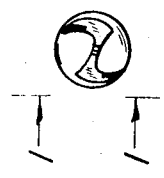
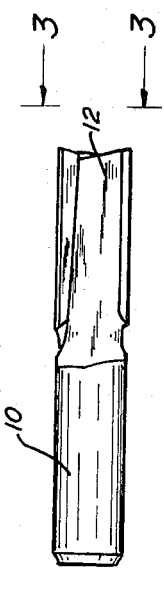

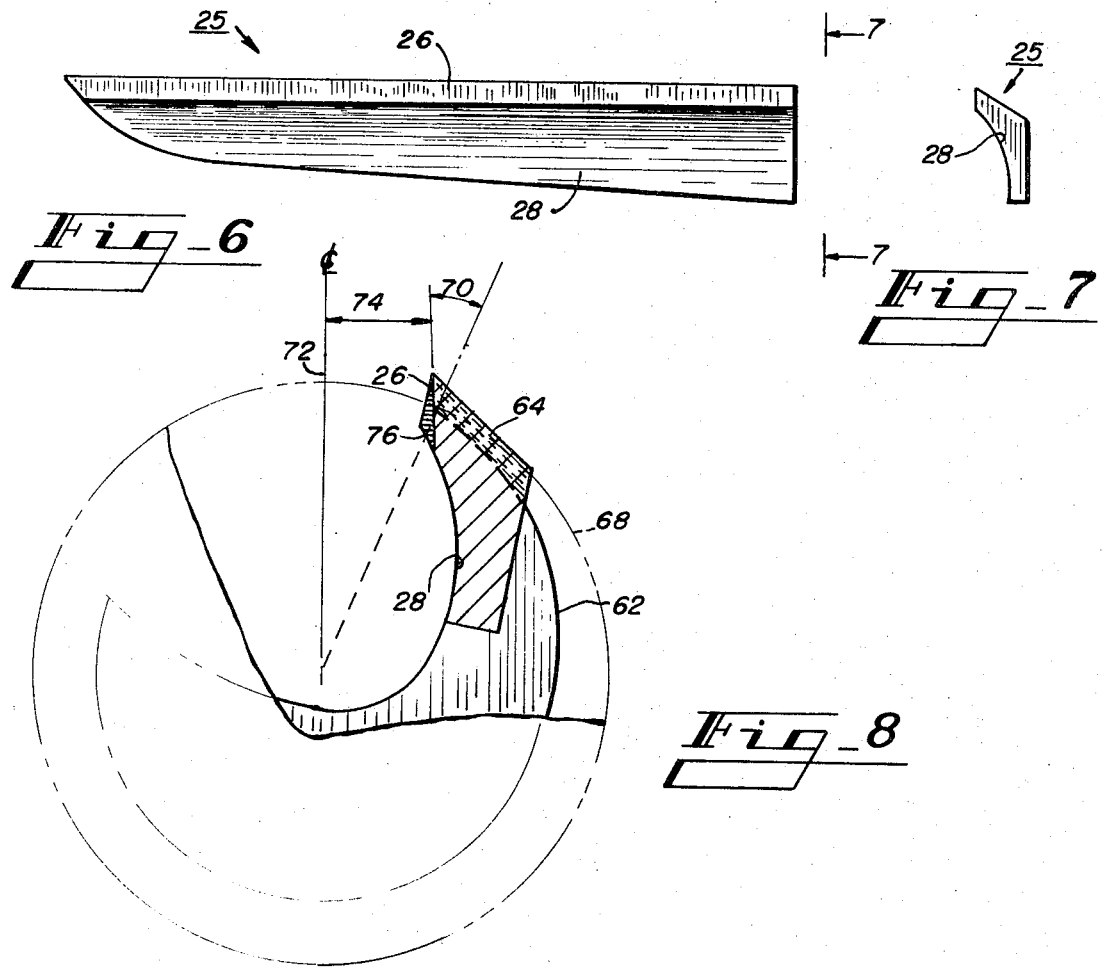

ROUTER BIT AND METHOD OF GRINDING SAID BIT

CROSS REFERENCE TO RELATED APPLICATIONS

This application is a divisional application of application Ser. No. 355,290, filed Apr. 27, 1973 by the Applicant and now U.S. Pat. No. 3,803,950 as issued on Apr. 16, 1974. Application Ser. No. 355,290 is a continuation-in-part of application Ser. No. 128,741, filed Mar. 29, 1971 and now abandoned. The drawings and subject matter of that application are incorporated by reference into this application.

BACKGROUND OF THE INVENTION

1. Field of the Invention

With reference to the classification of art as established in the United States Patent Office this invention pertains to a router bit found in the general Class of "Metal Working" (Class 29) and particularly to the subclass thereunder of "cutters, rotary" (subclass 103) and in the sharpening of the tool in the general Class of "Abrading" (Class 51) and the subclass of "radial face" (subclass 109) or the subclass of "drill, thread, thread cutting reamer and rotary cutter grinding" (subclass 288).

2. Description of the Prior Art

Router bits for use with power driven router machines are, of course, well known and bits with straight flutes are also commonly used. Carbide inserted edge portions in these router bits are also common; however, it is believed that prior to this invention it has been unknown to provide carbide inserts for straight flute router bits with their face portions formed with a short flat face to provide a sharply angled outer cutting edge. Immediately inside this short flat face is an arcuate concave relief formed in the insert and extending to the root of the flute. Several U.S. Patents have been issued pertaining to router bits and/or metal cutting end mills. A spiral fluted end mill is shown in U.S. Pat. No. 3,003,224 as issued to RIBICH on Oct. 10, 1961 and another end mill with special flute construction also to RIBICH is shown in U.S. Pat. No. 3,133,339 issued on May 19, 1964. A self-cleaning router bit having straight flutes with carbide inserted portions provided at the cutting edge is shown in U.S. Pat. No. 3,344,497 to OSBORNE as issued on Oct. 3, 1967. In the router bit of OSBORNE the face of the cutting edge is straight and continues inwardly to the root of the flute.

Conventional router bits, as used for plastic and wood, provide the face of the hardened insert cutting edge as a flat plane which does not readily clean itself or provide for a smooth discharge of cutting chips. Router bits having flat faces have a tendency for the chips to jam slightly against this flat face as the work is being machined. In the present invention, the inserted carbide bit portion is formed with a very short flat outer face which has a cutting angle from fifteen to thirty-five degrees depending on its use. This cutting face ranges from one thirty-second of an inch to three-sixteenths of an inch depending on the diameter of the bit. Inside this cutting face or portion there is formed an arcuate cutout which encourages the chips to curl and flow free rather than accumulate on the larger flat face as found in the prior art.

The router bit of this invention is easily and economically sharpened by dressing the narrow flat face portion by the use of a conventional cup-shaped diamond grinding wheel. In the reduction of practice of this invention, this narrow flat face portion if made as little as one thirty-second of an inch for a one-quarter inch cutter and one-sixteenth of an inch in width for a tool of one-half inch in diameter. The dull, used bit requires only a brief application of a grinding wheel to sharpen and restore the cutting edge of the router bit to the desired sharpened condition and at the desired angle from 15° to 35°. This sharpening may be repeated several times without materially reducing the diameter of the bit and it requires many sharpenings before the narrow face is lost.

SUMMARY OF THE INVENTION

The router bit and the sharpening of the router bit of this invention may be summarized at least in part by reference to its objects.

It is an object of this invention to provide, and it does provide, a router bit which is substantially self-cleaning and in which the cutting edges are made as hardened inserts preferably of tungsten carbide. These hardened inserts are shaped so as to provide a short flat outer cutting face extending inwardly from the cutting edge, which face terminates at a concave arcuate recess providing a clearance into which a grinding wheel may enter to grind a cutting angle from fifteen to thirty-five degrees.

It is a further object of this invention to provide, and it does provide, a router bit having straight flutes in which the cutting edges are made as hardened inserts preferably of tungsten carbide and with the face of the inserts shaped so as to provide a short flat outer face extending inwardly from the cutting edge for a distance of about one third-second of an inch to one-sixteenth of an inch. Adjacent this short flat face is formed a concave arcuate recess disposed to flow the chips as the router bit is rotated. This recess permits the bit to be initially sharpened with a light face grind and to be resharpened many times by grinding only the short flat face of the insert.

In addition to the above summary the following disclosure is detailed to insure adequacy and aid in understanding of the invention. This disclosure, however, is not intended to prejudice that purpose of a patent which is to cover the concept therein no matter how it may later be disguised by variations in form or additions of further improvements. For this reason there has been chosen a specific embodiment of the router bit with formed hardened cutting edges as adopted for use in a power-rotated router and showing a preferred means for grinding the short cutting faces of the straight-fluted router bit. This specific embodiment has been chosen for the purposes of illustration and description as shown in the accompanying drawings wherein:

BRIEF DESCRIPTION OF THE DRAWINGS

FIG. 1 represents a side view of a router bit and showing in particular a two-flute router bit having a size of approximately a half inch diameter of both shank and cutting area;

FIG. 2 represents a side view of the router bit of FIG. 1, this view taken on the line 2—2 of FIG. 1 and looking in the direction of the arrows so as to show the router bit at a ninety degree orientation to the view of FIG. 1;

FIG. 3 represents an end view of the router bit with the view taken on the line 3—3 of FIG. 1, and looking in the direction of the arrows;

FIG. 4 represents an enlarged end view of approximately four times the size of the end view of FIG. 3 and showing in particular the configuration and positioning of the hardened inserted cutting members as they are brazed or welded into the cutter forms;

FIG. 5 represents an enlarged end view similar to FIG. 4 and showing in particular the prior art as it is provided with a carbide inserted cutting edge;

FIG. 6 represents an enlarged face or plan view of a shaped hardened insert prior to brazing into the cutter form;

FIG. 7 represents an end view of the insert of FIG. 6 with the view taken on the line 7—7 of FIG. 6 and looking in the direction of the arrows, and FIG. 8 represents an enlarged view showing somewhat diagrammatically the method of grinding a selected cutting angle on a mounted cutting edge insert and the router form.

In the following description and in the claims various details will be identified by specific names for convenience; these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE PREFERRED EMBODIMENT

Referring now in particular to the invention as shown in FIGS. 1 through 4 and 6 through 8, it is to be noted that the router bit includes a shank 10 which is circular in cross-section. Assuming that the bit, as shown, is about full size in FIGS. 1 through 3 the cutting portion of the bit is provided with a length of about one and a half inches. The round shank portion is integral with a front contoured straight-flute portion 12 which, as shown in detail in FIG. 4, is formed with two flutes 14 and 16. In the outer edge of each of these flutes are formed longitudinal grooves 18 and 20 which are disposed to receive hardened inserts 22 and 24. These inserts are preferably of tungsten carbide since this material is easily preformed and is economical. Each of these inserts in the unmounted condition is identified as 25 and is contemplated as being substantially identical. As seen in FIGS. 6 and 7, each insert is preferably preformed before being brazed in grooves 18 and 20 formed in the fluted portion. Each of these inserts 22 and 24 is formed with a small face portion 26 which, as reduced to practice, is as little as one thirty-second or in the larger sizes one-sixteenth of an inch in width. Inwardly of this cutting face edge portion is an arcuate concave portion 28 which is formed in the casting of the insert and which in mounted condition mates with the curve of the inner flute shank portion 30. As reduced to practice, the inserts 22 and 24 when brazed or silver soldered in position in the flute portions of the router bit have their faces 27 lying in planes parallel to each other.

The initial cutting edge of the brazed insert is narrow and the final angle is established according to the material which it is to cut. A sharp cutting edge for cutting the work is provided when the router bit is rotated in the direction of the arrow. The flank or outer portion of each insert is relieved as in FIG. 8 so as to be slightly less than the radius of the cutting edge of the insert. This relief at the back of the insert extends to the router body flute which is then contoured or curved inwardly in the conventional manner.

As seen in FIGS. 1 and 2, the extent and length of the flutes may be about one and a half inches in length thus providing a router bit having a substantial face to which the work may be presented. However, this length is merely a matter of selection. The diameter and size of the router bit as above-described is also a matter of selection since the bits are conventionally made from one-quarter inch diameter and larger.

The router bits generally have regular lengths of flutes, viz. one inch, one and a half inches, two inches, etc. It is contemplated that the inserts 22 and 24 be mass produced as in FIGS. 6 and 7 in the shown cross-section and made in desired like lengths. It is further contemplated that the same insert as to cross-section be used whether the router bit be one-quarter inch in diameter, three-eighths inch in diameter, one-half, three-quarter, seven-eighths, one inch or other diameters. The flat face 26 and curved portion 28 of the insert having been previously established, it is only necessary that the grooves 18 and 20 be cut in a previously formed router bit body to accommodate these hardened inserts.

DESCRIPTION OF THE PRIOR ART AS SEEN IN FIG. 5

Referring now in particular to FIG. 5, this showing provides a comparison of the present invention to the prior art. In the prior art it is to be noted that in the conventionally inserted carbide router bit the insert carbide inserts 38 and 40 are formed with flat front faces 42 and 44. These inserts are then brazed or soldered into seats formed in flutes 46 and 48 in the conventional manner. After these inserts have been brazed in position, the outer edges of the cutter are ground to sharpen the bit. When this cutter is to be resharpened, it is conventional to grind the outer portion of the hardened insert from the outside. This sharpening by grinding the outer edge 50 and 52 reduces the diameter of the router and also reduces the depth or thickness of the carbide. This resharpening method requires a great amount of grinding in order to bring the router edges to a sharp condition. The flank must also, as shown, be relieved to provide the desired cutting action.

MAKING AND SHARPENING THE ROUTER BIT

Referring next to FIGS. 6, 7 and 8, it is to be noted that the insert 25 is formed with the arcuate relief 28 already formed. These inserts 25, as opposite members 22 and 24, are brazed in place in the grooves 18 and 20 formed in flutes 14 and 16. After the inserts are fixed in place the router bit is ground to shape and is sharpened to the desired angle as more fully described below.

With the rough formed router in a relief grinding fixture, the center of the shank is displaced from the center of the grinding radius to cause the outer diameter 60 to be ground until the desired flute relief is formed, as for example, the contour 62. During this relief grinding step the insert 25 has hatched portion 64 removed. This procedure is repeated for each flute whether one or two flutes are provided on the router. The insert is then sharpened after the cutting angle to be provided has been determined. For example, the usual cutting angle with this router is 23½°. Lesser or greater angles may be provided depending on the material to be cut. For example, assuming cutting angle 70 is to be 23½° and that the router is a half inch in diameter. The router is mounted in a rotatable holder with the axis of the router and the holder rotation in coincidence. The router is rotated to bring surface 26 into setting engagement with a stop whose right edge is on the center line 72. At or near the edge 62 the stop, which may be a finger not shown, is caused to engage the surface 26 and then with the router body and holder being rotated clockwise by engagement of the fixed stop with edge 26 the cutter holder is moved leftwardly until distance 74 is one hundred-thousandths of an inch. The holder is locked as to rotation, the stop is moved from surface 26 and a diamond cup wheel is then used to remove hatched portion 76 and provide a sharp edge on the inserted carbide member. The resulting cutting angle 70 is 23½°. Increasing distance 74 increases the cutting angle 70 and decreasing the distance 74 decreases the cutting angle. Cutting angles 70 from a minimum of 15° to angles as great as 35° are made by this method. For example, with the present invention the cutting angle for wood is 23½°; for plastic 28° and for softer metals 33°. The initially sharpened cutters have their cutting face or surface 26 from one thirty-second to one-sixteenth inch in width. Resharpening requires only removal of a few thousandths of an inch from surface 26, the angle being established as by the initial forming. With each resharpening the surface 26 gets wider. Usually the insert is replaced by another insert when re-grinding causes the surface 26 to enter the arcuate relief 28 to an extent sufficient to diminish the cutting efficiency.

USE AND OPERATION OF THE ROUTER BIT OF THE PRESENT INVENTION

Referring now in particular to FIGS. 4, 6, 7 and 8 and the hardened insert portions shown therein, it is to be noted that the short flat face of the router bit, although it may not provide an edge more sharp than the prior art router bit of FIG. 5, has a short flat front face 26 which provides the cutting edge and in practice this edge remains effectively sharp for a longer time because of the effectiveness of forming a chip as the removed material enters and is curled by the arcuate formation 28. When this edge does become dull it is easy to sharpen the carbide inserts 22 and 24 as above described since it is only necessary and desired that the flat face portions 26 be presented to the grinding wheel. With only this narrow face of approximately one thirty-second to one-sixteenth of an inch to grind, in a short time a few thousandths of an inch removal is accomplished by a diamond grinding wheel to again bring the router bit to its original sharp cutting condition. This small removal enables the router bit to retain its substantially original contour and size for a much longer time than is accomplished with the conventional router bit of FIG. 5 which is sharpened by being ground from the outer diameter thus reducing the diameter each time the bit is sharpened. The router bit of this invention in addition to being easily sharpened provides the additional advantage of a much cleaner cutting chip due to the arcuate face formed adjacent to the short cutting face.

Although the hardened inserts are contemplated as being of tungsten carbide, other hardened materials may be selected from the many which are conventionally used. The flat face 26, of course, is a smooth ground surface and the arcuate surface 28 is contemplated as being smoothly finished so that the material being cut will form clean chips. The body of the router bit of this invention may be salvaged for reuse by replacing the inserts 22 and 24 with new members after the initial inserts have been sharpened many times and the flat face 26 approaches the trough of the arcuate portion 28. Since the flute portions of the body are not altered in the preferred manner of sharpening the router bit of this invention, reasonable care in the use of the bit permits many insert replacements to be made without changing the initial character of the bit.

The grinding of the router bit of this invention includes mounting the rough formed router in a relief grinding fixture and displacing the center of the shank from the center of a grinding radius to enable the desired flute relief to be formed; grinding each flute to the desired flute relief contour; the sharpening of the cutting angle of the face of the flute at an angle of 15 to 35° includes mounting the router bit in a rotatable holder with the axis of the router bit and the holder rotation in coincidence. After the router bit is positioned with the axis of the router bit and holder in coincidence, the holder is rotated to bring the short flat face of the flute to be sharpened and the axis of the bit into a set plane which is parallel to the cutting face of that grinding wheel which is to finish the flat face, this position being the stop position; clamping the router bit in this stop position and moving the router bit and holder a determined distance transversely to the set plane, this distance being an amount sufficient to establish a selected cutting angle of the cutting edge which angle is between 15 and 35° and moving the grinding wheel into grinding engagement of only the short flat face of the flute and to lightly grind this face with longitudinal passes of the grinding wheel. When and after a sharp edge has been formed on the cutting edge the grinding is discontinued for this flute, the sharpening step being repeated for each flute until all flutes are sharpened after which the router bit is removed from the rotatable holder.

Terms such as "left", "right", "up", "down", "bottom", "top", "in", "out" and the like are applicable to the embodiment shown and described in conjunction with the drawings. These terms are merely for the purposes of description and do not necessarily apply to the position in which the router bit and the grinding fixtures used therewith may be constructed or used.

While a particular embodiment of the router bit has been shown and described it is to be understood the invention is not limited thereto and protection is sought to the broadest extent the prior art allows.

What is claimed is:

1. The method of grinding a router bit for the cutting of wood, plastic and soft metals, said router bit formed with a shank portion and at least one straight flute, the flute having as insert of hardened material which in its secured position is formed to provide a short flat outer cutting edge face and adjacent this edge and in the face of the insert is formed an arcuate concave relief, the grinding of the router bit including the steps of: (a) mounting the router bit in a relief grinding fixture and positioning the axis of the shank so that the axis is displaced from the center of the grinding radius after which there is the step of grinding the outer flute to provide the desired flute relief; (b) repeating the relief grinding of and for each flute and after all flutes have been relief ground there is performed the step of removing the router bit from the relief grinding fixture; (c) mounting the router bit in a rotatable holder with the axis of the router bit and holder in coincidence and rotating the holder to bring the short flat face of the flute to be sharpened and the axis of the bit into a set plane which is parallel to the cutting face of that grinding wheel which is to finish the flat face, this position being the stop position; (d) clamping the router bit in this stop position and moving the router bit and holder a determined distance transversely to the set plane, this distance being an amount sufficient to establish a selected cutting angle of the cutting edge, which angle is between 15° and 35°, and (e) moving the grinding wheel into grinding engagement of only the short flat face of the flute and to lightly grind this face with longitudinal passes of the grinding wheel and after a sharp edge has been produced to discontinue the grinding of the flute face, this sharpening step being repeated for each flute until all flutes are sharpened after which the router bit is removed from the rotatable holder.

2. The method of grinding a router bit as in claim 1 in which the hardened material is carbide and the setting of the set plane for the short face of the flute includes providing a removable stop against which the face of the flute is initially brought and in which the short flat cutting edge face is ground using a diamond cup shaped grinding wheel.

* * * * *